US006596333B1

(12) United States Patent
Vaghela et al.

(10) Patent No.: US 6,596,333 B1
(45) Date of Patent: Jul. 22, 2003

(54) PROCESS FOR PRODUCING AERATED FROZEN PRODUCTS

(75) Inventors: Madansinh Vaghela, Marysville, OH (US); Tawfik Yousef Sharkasi, Cairo (EG); Björn Groh, Marysville, OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/590,953

(22) Filed: Jun. 9, 2000

Related U.S. Application Data

(60) Provisional application No. 60/144,828, filed on Jul. 21, 1999.

(51) Int. Cl.$^7$ .................................................. A23G 9/04
(52) U.S. Cl. ........................ 426/565; 426/100; 426/101; 426/565
(58) Field of Search ................................ 426/100, 101, 426/565, 567

(56) References Cited

U.S. PATENT DOCUMENTS

| | | | |
|---|---|---|---|
| 2,048,364 A | * 7/1936 | Willems | 426/101 |
| 3,673,106 A | 6/1972 | Jonas et al. | 252/356 |
| 3,821,442 A | * 6/1974 | MacDonald et al. | 426/565 |
| 3,924,018 A | 12/1975 | Sims et al. | 426/565 |
| 3,928,648 A | 12/1975 | Stahl et al. | 426/564 |
| 4,012,533 A | 3/1977 | Jonas | 426/565 |
| 4,431,682 A | 2/1984 | Smith et al. | 426/565 |
| 4,450,182 A | 5/1984 | Stahl et al. | 426/565 |
| 4,451,492 A | 5/1984 | Dell et al. | 426/564 |
| 4,452,824 A | 6/1984 | Cole et al. | 426/565 |
| 4,500,553 A | * 2/1985 | Liggett et al. | 426/565 |
| 4,505,943 A | 3/1985 | Dell et al. | 426/565 |
| 4,542,035 A | 9/1985 | Huang et al. | 426/565 |
| 4,724,153 A | 2/1988 | Dulin et al. | 426/565 |
| 4,795,650 A | 1/1989 | Groobert | 426/305 |
| 4,828,866 A | 5/1989 | Wade et al. | 426/599 |
| 5,084,295 A | 1/1992 | Whelan et al. | 426/565 |
| 5,112,626 A | 5/1992 | Huang et al. | 426/43 |
| 5,171,602 A | 12/1992 | Martin et al. | 426/567 |
| 5,175,013 A | 12/1992 | Huang et al. | 426/565 |
| 5,292,030 A | 3/1994 | Kateman et al. | 222/1 |
| 5,343,710 A | 9/1994 | Cathenaut et al. | 62/71 |
| 5,384,145 A | 1/1995 | Gonsalves et al. | 426/565 |
| 5,403,611 A | 4/1995 | Tomita et al. | 426/565 |
| 5,472,726 A | 12/1995 | Bee et al. | 426/565 |
| 5,486,372 A | 1/1996 | Martin et al. | 426/565 |
| 5,486,373 A | 1/1996 | Holt et al. | 426/565 |
| 5,758,571 A | 6/1998 | Kateman et al. | 99/455 |
| 5,879,731 A | * 3/1999 | Beckett et al. | 426/101 |
| 6,083,546 A | * 7/2000 | Carrick et al. | 426/565 |

FOREIGN PATENT DOCUMENTS

| | | |
|---|---|---|
| EP | 0 157 594 | 10/1985 |
| EP | 0 191 487 | 8/1986 |
| EP | 0 455 288 | 11/1991 |
| GB | 1446144 | 8/1976 |
| WO | WO 93/21777 | 11/1993 |
| WO | WO 94/21138 | 9/1994 |
| WO | WO 98/09536 | 3/1998 |
| WO | WO 98/18350 | 5/1998 |
| WO | WO 00/01246 | 1/2000 |

OTHER PUBLICATIONS

D.W. Olson, C.H. White, Journal of Dairy Science Abstract, 1995, 78 (Suppl. 1) 149.

* cited by examiner

*Primary Examiner*—Lien Tran
(74) *Attorney, Agent, or Firm*—Winston & Strawn

(57) ABSTRACT

A process for the production of a aerated frozen products by preparing a mixture of ingredients suitable for a frozen aerated product, adding an emulsifier mixture, aerating the mix to obtain an aerated mix having an overrun of about 20% to about 250%, and about 5% to about 100% for the frozen aerated ice cream and water ice, respectively, and freezing the aerated mix to produce the aerated ice cream or water ice.

18 Claims, 4 Drawing Sheets

Microscopic picture of ice crystals in fresh samples

1. Standard

2. Test

Microscopic picture of ice crystals in heat shocked samples

1. Standard

2. Test

PROCESS FOR PRODUCING AERATED FROZEN PRODUCTS

CROSS-REFERENCE TO RELATED APPLICATIONS

This application claims the benefit of provisional application No. 60/144,828 filed Jul. 21, 1999, the content of which is expressly incorporated herein by reference thereto.

FIELD OF THE INVENTION

The present invention is directed to an aerated frozen products, including, but not limited to, ice cream, water ice, frozen yogurt, etc., and the methods for preparing the aerated frozen products.

BACKGROUND OF THE INVENTION

Traditionally, molded aerated frozen bars, ice cream, or water ice are manufactured by partially freezing an ice cream mix, ice milk mix, frozen yogurt mix, water ice mix, or fruit juice mix in conventional batch or continuous freezers followed by pumping and filling the mix into molds of different shapes and sizes. During the last decade, a new generation of freezers has been developed which are equipped with pre-whippers that enable the mix to be pre-aerated before being partially frozen in the freezer. The molded products are usually quiescently frozen using a cold brine system at −30° C. to −40° C. If desired, after demolding, the molded products may be coated with chocolate or compound coating. Finally, the products are usually packaged and stored at about −30° C. until transport and distribution.

This traditional process for manufacturing molded aerated frozen bars, ice milk, yogurt, ice cream, or water ice has limitations. For example, the partial freezing of the mix in the freezer, followed by quiescent freezing in the molds, leads to the formation of an icy texture, loss of air, and formation of large air cells in the product having a size range of about 110–185 microns (Arbuckle, W. S. Ice Cream, Fourth Edition, 1986, Van Nostrand Reinhold, New York, p 234). Shrinkage of the products is often a problem and when eating the product, a very cold feeling in the mouth is experienced. Furthermore, it is difficult to achieve more than 20% overrun in water ice, a typical overrun is from 0% to 20% and usually is about 5%. It is very difficult to achieve more than 80% overrun and almost impossible to achieve an overrun of 120% or higher in finished ice cream products using conventional manufacturing.

Non molded products have similar problems. Air cells and ice crystals start growing immediately after production of non molded products. Significant air cell and ice crystal growth occurs during transportation, storage at the grocery store or during transportation and storage of the products by the consumer. None of the available non molded ice cream or water ice products inhibit or delay air cell or ice crystal growth after production or during hardening, transportation, or distribution.

Currently, there is no process that can produce very stable finely aerated frozen ice cream, ice milk, yogurt, or water ice having an average air cell size of less than 50 microns and an average ice crystal size of 25 microns or that are heat shock resistant for a period of time after production. Thus, there is a need for finely aerated ice cream, ice milk, yogurt or water ice that maintain a smooth texture, do not suffer from shrinkage, do not give a very cold feeling in the mouth, have an uniform appearance without large air pockets on the surface and have a significantly higher heat shock resistance. Moreover, no process can produce a stable overrun of more than 20% to about 100% for water ice products or an overrun between about 20% to about 250% for ice cream products. The present invention provides products and processes which overcome these disadvantages.

SUMMARY OF THE INVENTION

The present invention relates to a process for the production of aerated frozen products comprising the steps of preparing a mixture of ingredients suitable for preparing a aerated frozen product, adding an emulsifier or mixture thereof in a suitable amount to obtain a mix, aerating the mix to obtain an aerated mix having an overrun of about 20% to about 250% for ice cream products and an overrun of about 5% to about 100% for water ice products, and freezing the aerated mix to form the aerated frozen product. In this process, the mix can be an ice cream mix, a water ice mix, a fruit juice mix, a frozen yogurt mix, a sherbet mix, or a mixture thereof.

The emulsifier mixture comprises at least one emulsifier capable of facilitating the formation and stabilization of fat α-crystals and present in an amount of about 0.01% to about 3% by weight of the mix. The emulsifier can be at least one of propylene glycol monostearate, sorbitan tristearate, lactylated monoglycerides, acetylated monoglycerides, or unsaturated monoglycerides, preferably the emulsifier mixture comprises propylene glycol monostearate, sorbitan tristearate, and unsaturated monoglycerides.

The mix of ingredients is typically prepared using conventional methods such as by combining the ingredients with shear mixing to disperse and solubilize them into a homogeneous mass, followed by homogenizing the mass and pasteurizing the homogenized mass. The homogenizing step can be conducted in a two stage homogenizer at a pressure of about 70 bar to about 250 bar in the first stage and of about 0 bar to about 50 bar in the second stage. Also, the mix can be aged after pasteurization by storing at a temperature of about 0° C. to about 6° C. for about 1 hour to about 24 hours. If desired, the mix can be colored and flavored before being aerated at a temperature of about 0° C. to about 12° C. to obtain the desired overrun. Preferably, the aerated mix is directly fed to a container or mold and frozen to produce the aerated frozen product, with the freezing being allowed to take place quiescently at a temperature of about −25° C. to about −45° C.

The aerating step can be conducted by allowing the mix pass through a conventional freezer at a temperature of about −4° C. to about −7° C. In contrast, for molded products, the aerating step can be a whipping step conducted by using a conventional mixer at a speed of about 150 rpm to about 1000 rpm and at a flow rate of about 10 L/h to about 1000 L/h.

The invention also relates to an aerated frozen ice cream or water ice which comprises a mixture of ingredients suitable for frozen aerated ice cream or water ice and at least one emulsifier for facilitating formation and stabilization of fat α-crystals.

The aerated frozen ice cream or water ice have an overrun of about 20% to about 250% and of about 5% to about 100%, respectively, and contain air cells having an average size of less than about 50 microns which cells are uniformly distributed throughout the ice cream or water ice and which are substantially invisible to the naked eye. Preferably, the aerated frozen products have air cells with an average size of about 15 microns to about 40 microns and an ice crystal size of less than about 30 microns. The process produces an aerated frozen product having a smooth texture similar to an extruded ice cream and heat shock resistant such that the apparent change in product volume after heat shock treatment is less than about 5% by volume.

If desired, the aerated frozen products can contain inclusions or have a coating that optionally contains inclusions, which are added before or during freezing. Further, the aerated frozen products may be in shell and core products with ice cream as a core and water ice, fruit juice, fruit ice, real fruit, or a mixture thereof as a shell or coating. The latter having an overrun of about 0% to about 20%.

DETAILED DESCRIPTION OF THE INVENTION

Figure 1:
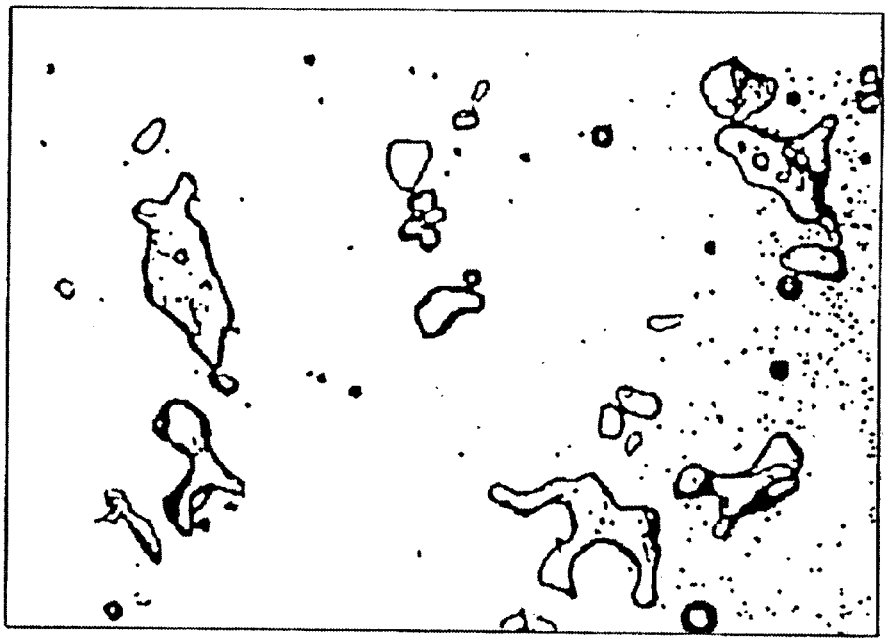
FIG. 1 illustrates ice crystals in a conventionally molded aerated ice cream bar after heat shock.

It has now been found that aerated frozen products mix can be finely aerated in a freezer to a desired overrun by using an emulsifier blend for bulk ice cream, bulk water ice, bulk yogurt, individual ice cream portions, cones, bars, etc. The emulsifier blend preferably contains a mixture of propylene glycol monostearate, sorbitan tristearate, and unsaturated monoglycerides. This procedure eliminates the whipping step of the prior art which either conducts a whipping step prior to freezing followed by molding, or partially freezes a mixture, followed by molding. Neither process of the prior art provides a frozen ice cream, ice milk, yogurt, or water ice product that has a fine and stable aerated structure.

The emulsifier blend of the present invention facilitates and stabilizes fat α-crystals. Typically, in conventionally prepared frozen products, fat is present in a β-crystal structure. The fat β-crystal is an energetically lower crystal structure and thus, a preferred configuration for fat crystals. The emulsifier blend of the present invention, however, facilitates the formation and stabilization of the higher energy configuration fat α-crystals in the frozen aerated products.

The presence of fat α-crystals in the aerated frozen products has several advantages. The fat α-crystal configuration supports and stabilizes a fat film or structure surrounding the air cells which prevents small air cells from agglomerating into larger air cells. Also, the surface areas of the fat α-crystals serve as barriers that do not allow ice crystals, within the aerated frozen products, to grow into larger ice crystals. The formation of small air cells and their stabilization through fat α-crystals substantially restricts the growth of ice crystals and this in turn, creates an aerated frozen product with a smoother, creamier texture and which is heat shock resistant.

Furthermore, the process of the present invention yields an ice cream product with an unconventionally high overrun of about 20% to about 250% and an unconventionally high overrun for water ice products of about 5% to about 100%. Moreover, the aerated frozen products have a significantly higher resistance to shrinkage and heat shock, have a smoother uniform air pocket free appearance, and a creamier and more desirable eating quality compared to conventionally prepared products.

The term "aerated frozen products," as used herein, unless otherwise indicated, means ice cream, water ice, yogurt, frozen yogurt, sherbert, fruit ice, low fat ice cream, ice milk, etc.

The term "heat shock," as used herein, unless otherwise indicated, means the temperature fluctuations related to the storage and transportation of frozen ice cream, ice milk, yogurt, or water ice product. Heat shock can be simulated by treating a frozen ice cream product to temperature cycling of about −8° C. to about −20° C. every 12 hours, with 30 min temperature ramp time for a period of about two weeks, or by any other method commonly used in the industry.

The mixture suitable for an aerated frozen product may be any conventional mix such as an ice cream mix, a frozen yogurt mix, a water ice mix, a fruit juice mix, a sherbet mix, or a combination thereof with the emulsifier blend used in the present invention. An ice cream mix may contain fat, non-fat milk solids, carbohydrates, or stabilizers together with water and, if desired, other conventional ingredients such as mineral salts, colorants, flavorings, inclusions, etc. A water ice mix comprises fruit juices, sugar, stabilizer, and small amounts of milkfat and non-fat milk solids.

A typical aerated frozen product mix may contain fat in an amount of about 0.5% to about 18% by weight based on the total weight of the mix, non-fat milk solids in an amount of about 6% to about 15% by weight based on the total weight of the mix, sugar in an amount of about 10% to about 15% by weight based on the total weight of the mix, a sweetener in an amount of about 3% to about 8% by weight based on the total weight of the mix, an emulsifier blend in an amount of about 0.01% to about 3% by weight based on the total weight of the mix, and a stabilizer in an amount of about 0.1% to about 1% by weight based on the total weight of the mix.

The fat used may be a dairy fat, a non-dairy fat, or a mixture of both. When the fat is a dairy fat, it may be for instance, any milk fat source such as butter oil, butter, real cream, or a mixture thereof. When the fat is a non-dairy fat it may be, for instance, an edible oil or fat, preferably a vegetable oil such as coconut oil, palm kernel oil, palm oil, cotton oil, peanut oil, olive oil, soy bean oil, etc., or mixtures thereof.

The sugar used may be sucrose, glucose, fructose, lactose, dextrose, invert sugar either crystalline or liquid syrup form, or mixtures thereof.

The sweetener may be a corn sweetener in either a crystalline form of refined corn sugar (dextrose and fructose), a dried corn syrup (corn syrup solids), a liquid corn syrup, a maltodextrin, glucose, or a mixture thereof.

The emulsifier may be at least one emulsifier that facilitates formation and stabilization of fat α-crystals. The emulsifiers include but are not limited to propylene glycol monostearate ("PGMS"), sorbitan tristearate ("STS"), lactylated monoglycerides, acetylated monoglycerides, unsaturated monoglycerides, including monoglycerides with oleic acid, linoleic acid, linolenic acid, or other commonly available higher unsaturated fatty acids. Preferably, the emulsifier blend comprises at least one of PGMS, STS, or unsaturated monoglycerides. More preferably the emulsifier blend comprises a combination of PGMS, STS, and unsaturated monoglycerides. The emulsifier blend should be present in an amount of about 0.01% to about 3%, preferably of about 0.1% to about 1%, and more preferably of about 0.2% to about 0.5% by weight of the mix. Preferably the emulsifier blend should be present in a combination of PGMS, STS, and unsaturated monoglycerides. PGMS, STS, and unsaturated monoglycerides should be present in an amount of about 0.1% to about 1%, of about 0.01% to about 0.2%, and of about 0.01% to about 0.2% by weight of the mix, respectively. Preferably, PGMS, STS, and unsaturated monoglycerides should be present in an amount of about 0.2% to about 0.5%, of about 0.02% to about 0.05%, and of about 0.02% to about 0.1% by weight of the mix, respectively. More preferably, the emulsifier blend should be present in a combination of PGMS, STS, and unsaturated monoglycerides and in amounts of about 0.25% to about 0.35%, of about 0.02% to about 0.03%, and of about 0.02% to about 35 0.05% by weight of the mix, respectively.

The stabilizer may be, for instance, a hydrocolloid such as agar, gelatin, gum acacia, guar gum, locust bean gum, gum tragacanth, carrageenan and its salts, carboxymethyl cellulose, sodium alginate or propylene glycol alginate, or any mixture of hydrocolloids.

A typical process for the preparation of aerated frozen products can be carried out using conventional equipment. The first step comprises mixing the ingredients under shear mixing to disperse and/or solubilize the ingredients into a homogeneous mass. One of ordinary skill in the art with little or no experimentation can determine mixing time and conditions to obtain the desired homogeneous mass. Thereafter, the homogeneous mass is preheated, e.g., to a temperature of about 62° C. to about 75° C. The preheated homogeneous mass is conventionally homogenized, e.g., in a two stage homogenizer. The first stage is conducted at a pressure of about 70 bar to about 250 bar, preferably of about 100 bar to about 150 bar, more preferably about 150 bar. The second stage is conducted at a pressure of about 0 bar to about 50 bar, preferably of about 20 bar to about 35 bar. Subsequently, pasteurization of the homogenized mass is conducted under conditions commonly used in the industry.

The pasteurization step is conducted at a temperature of about 50° C. to about 100° C., preferably of about 60° C. to about 85° C. for a time of about 10 seconds to about 30 minutes, preferably for time of about 30 seconds followed by cooling to a temperature of about 0° C. to about 10° C., preferably at a temperature of about 4° C. Preferably, pasteurization is conducted by either high temperature short time (HTST) or low temperature long time (LTLT) processing.

After pasteurization, the mix is preferably aged by allowing to stand at a temperature of about 0° C. to about 6° C., preferably of about 1° C. to about 5° C. and for a time of about 1 hour to about 24 hours, preferably of about 2 hours to about 18 hours and more preferably of about 4 hours to about 12 hours.

The mix is then colored and flavored as needed.

Subsequently, the mix is allowed to aerate in a conventional freezer for bulk, extruded, or cone products. If the mix is allowed to aerate in a conventional freezer, the draw temperature of the frozen aerated product should be sufficient to generate a viscosity and shear in the freezer barrel to create fine air cells of average mean diameter of 50 microns or less after hardening of the aerated frozen product. Typically, drawing temperatures include about −4° C. to about −10° C., preferably of about −5° C. to about 8° C.

If the mix is whipped using a conventional freezer, any freezer commonly used in the industry can be used to whip the mixture, e.g. Hoyer, CBW, PMS, etc. The mix is normally pumped into the freezer at a temperature of about 0° C. to about 8° C., preferably of about 2° C. to about 4° C. and substantially simultaneously an appropriate amount of air is introduced into the mix. Depending upon overrun desired in the final product a skilled artisan can easily determine the amount of air required. The step of freezing under agitation is conducted depending upon the freezing point of the mix. Typically, the step is conducted at a temperature of about −4° C. to about −8° C., preferably of about −5° C. to about −6° C. The time required is dependent on the amount of mix and air, and the pumping flow rate. An artisan can easily determine this without undue experimentation.

Subsequently, the aerated frozen product is packaged into bulk containers, extruded for bars or cones, or packaged into small containers. Bulk containers include container sizes of 3 gallons to 0.5 L, and small containers include container sizes of 250 ml to 50 ml.

The overrun for ice cream products aerated using a conventional freezer is in the range of about 20% to about 35 250%, preferably of about 40% to about 175%, more preferably of about 80% to about 150%. The overrun for molded ice cream products aerated using a whipper is in the range of about 40% to about 200%, preferably of about 80% to about 150%. The overrun for aerated water ice is in the range of about 5% to about 100%, preferably of about 20% to about 60%.

The aerated mix is then fed, preferably directly, to a container, e.g., by pumping through a filler, and then allowed to harden. Hardening may be allowed to take place either by using blast freezers or nitrogen tunnel at a temperature of about −30° C. to about −60° C. or quiescently at a temperature of about −25° C. to about −45° C., preferably of about −30° C. to about −40° C., or by other conventionally acceptable methods.

The aerated frozen products may afterwards be stored at a freezing temperature, usually at a temperature in the range of about −25° C. to about −35° C., preferably of about −28° C. to about −32° C., and more preferably at about −30° C. If desired, the product can be repackaged before shipping. Also for individual sized portions the aerated frozen products may be coated, for instance with chocolate or a compound coating. Compound coatings include coatings which do not contain 100% cocoa fat and coatings that contain any vegetable oil, such as canola oil, corn oil, soy oil, coconut oil, etc., or mixtures thereof. These coatings may also contain inclusions such as nut pieces, fruit pieces, rice crisps, or other additives therein. Furthermore, the aerated frozen product may be placed between cookies, or other edible substrates to form ice cream sandwiches or the like. The final aerated frozen products are then packaged and stored at a freezing temperature.

The aerated frozen products may include a shell rather than a coating. The shell material may include fruit juice, fruit ice, real fruit, water ice, or mixtures thereof. The shell may also have an overrun of about 0% to about 20%.

The aerated frozen product produced by the process of the present invention has a creamier and warm eating quality, and a smooth, uniform, homogeneous texture and appearance, with small air cells of an average size of less than about 50 microns uniformly distributed substantially none of which are visible to the naked eye. Preferably, the small air cells have an average size of about 15 microns to about 40 microns, and more preferably of about 20 microns to about 35 microns. The aerated frozen products have an average ice crystal size less than ice crystals in conventionally prepared ice cream or water ice before and after heat shock, improved heat shock resistance and improved shrinkage resistance.

The aerated frozen products of the present invention have an average air cell size of less than 50 microns and ice crystal size of about 25 microns. The frozen aerated products of the present invention, after heat shock subsequent to production, have an average air cell size similar to the untreated product, an average ice crystal size below about 30 microns, and an apparent change in product volume of less than about 5% by volume. Also, the frozen aerated products can maintain a smoother and creamier texture and mouth feel, do not suffer from shrinkage, and do not give a cold feeling in the mouth.

To summarize, the aerated frozen products produced by the process of the present invention have a texture which is smoother, creamier and have a warmer mouth feel than a conventionally ice cream or water ice even at lower overruns. The present invention also provides an aerated frozen ice cream having an overrun of about 20% to about 250% and a water ice having an overrun of about 5% to about 100% with small air cells uniformly distributed and substantially none of which are visible to the naked eye.

FIG. 1 illustrates the ice crystals of a conventionally prepared molded aerated ice cream bar after heat shock, taken with a microscope at −20° C. The ice crystals are substantially larger and straighter in shape.

Figure 2:
FIG. 2 illustrates ice crystals in a molded aerated ice cream bar, made by a process for producing frozen aerated ice cream, after heat shock.

FIG. 2 illustrates the ice crystals of aerated frozen ice cream prepared as taught by the present invention taken with a microscope at −20° C. FIG. 2 shows that the ice crystals in products produced according to the present invention are thinner than ice crystals of conventionally prepared frozen bars and of a substantially curved rod like shape.

Figure 3:
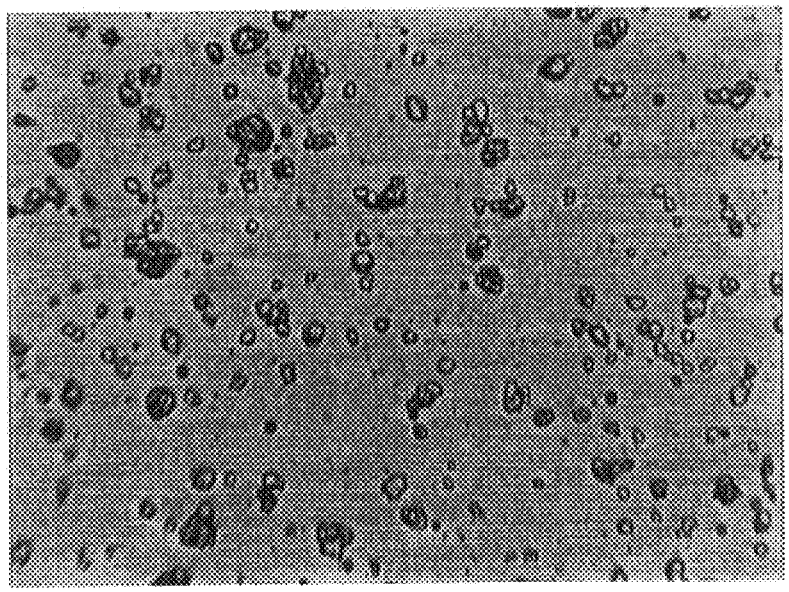
FIG. 3 illustrates ice crystals of conventionally prepared ice cream samples (standard) and ice cream samples of the present invention (test).
Figure 3:
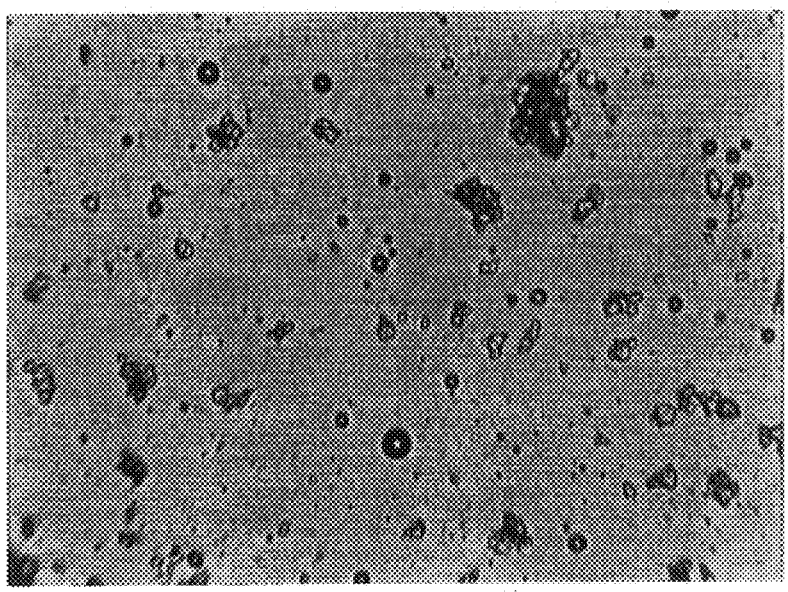

FIG. 3 illustrates the ice crystals of a conventionally prepared ice cream sample (standard) as compared to an ice cream sample made using the present invention. The standard ice cream sample clearly contains ice crystals of larger size than the ice crystals of the ice cream sample using the present invention. Additionally, FIG. 4 demonstrates that the standard ice cream sample after heat shock treatment contains larger ice crystals in comparison to the test sample prepared using the present invention.

Figure 4:
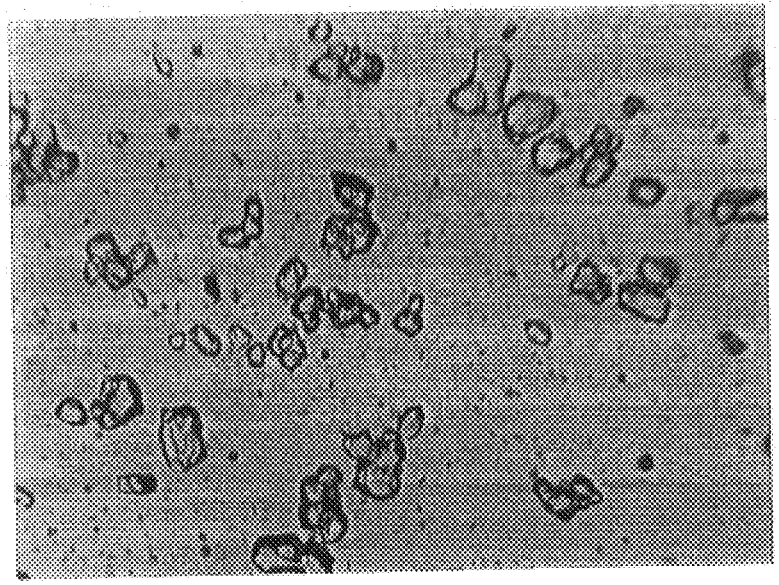
FIG. 4 illustrates ice crystals of heat shocked conventionally prepared samples (standard) and samples of the present invention (test).
Figure 4:
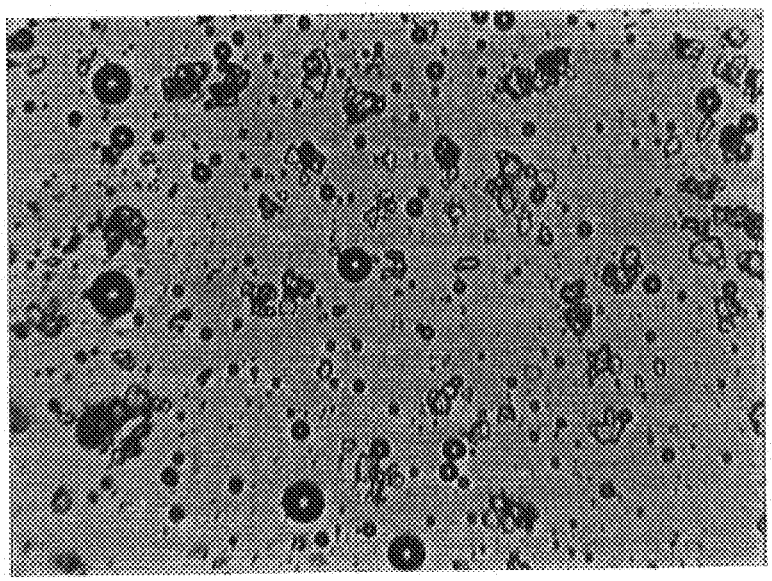
Figure 5:
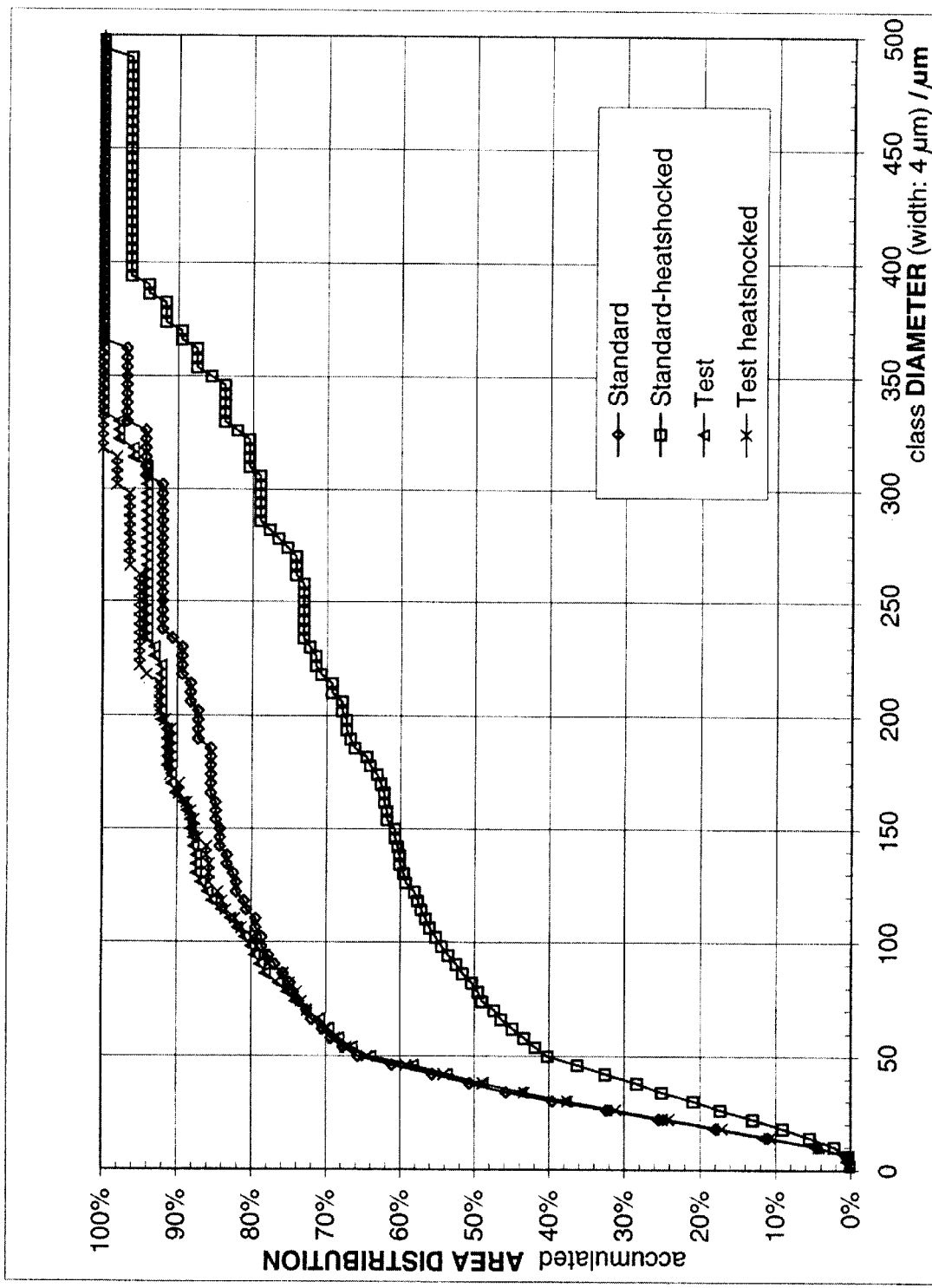
FIG. 5 illustrates a comparison of air bubble distribution of conventionally prepared standard samples and samples prepared using the present invention before and after heat shock treatment.

The relationship shown in FIGS. 3 and 4 is graphically represented in FIG. 5 where air bubble distribution for both standard and test samples (samples prepared by the present process) is tabulated. The standard sample air cell size, represented by the accumulated area distribution, drastically increases after heat shock treatment, thus indicating severe air cell size growth. In contrast, the test sample accumulated area distribution is unaffected by heat shock treatment. Consequently, after heat shock treatment, the average ice crystal size in the test sample remains constant while conventionally prepared ice cream undergoes significant ice crystal growth.

EXAMPLES

The following Examples and accompanying drawings further illustrate the present invention.

Example 1

An ice cream mix was prepared from 8% (by weight) partially hydrogenated palm kernel oil, 11% nonfat milk solids, 12% sucrose, 6% corn syrup solids (36DE) and 0.5% of a stabilizer blend containing combinations of hydrocolloids such as guar, locust bean gum, carrageenan, carboxymethyl cellulose, etc. together with emulsifiers. The ingredients were mixed with agitation to disperse and solubilise them into a homogeneous mass, homogenized with a two stage homogenizer at 2000 psig pressure at the first stage and 500 psig pressure at the second stage, followed by HTST pasteurization.

After pasteurization, the mix was aged by refrigerated storage at a temperature of 4° C. for 6 hours.

The aged mix was colored, flavored, and then aerated in an Oakes Mixer at a temperature of 4° C. to an overrun of 130%.

The aerated mix was pumped to a mold and allowed to freeze to give the frozen molded bar. The freezing was allowed to take place quiescently at a temperature of −40° C. using cold brine. The frozen molded bar was demolded and subsequently coated with chocolate crunch bar at 35° C., packaged, and stored at −30° C.

The frozen molded bar produced by the process of the present invention had a creamier and warm eating quality of an extruded product, a smooth, uniform, homogeneous texture and appearance, with small air cells of an average size of less than 50 microns uniformly distributed substantially none of which were visible to the naked eye. The molded aerated frozen bar had a quick melt with substantially no lingering of product in the mouth. Ice crystals in the molded aerated frozen bar had a unique thin and substantially curved rod like shape and an average size of less than ice crystals in a conventionally molded aerated ice cream bar after heat shock, and had improved heat shock and shrinkage resistance.

Example 2

A water ice mix was prepared from 23% (by weight) sucrose, 7% corn syrup solids (36 DE) and 0.6% stabilizer blend containing combinations of hydrocolloids, such as guar, locust bean gum, pectin, carboxymethyl cellulose, gelatin, microcrystalline cellulose, hydrolyzed soy or milk proteins, etc. with or without emulsifiers. The ingredients were mixed with agitation to disperse and solubilise them into a homogeneous mass in water, homogenized with a two stage homogenizer at 1500 psig pressure at the first stage and 500 psig pressure at the second stage, followed by HTST pasteurization.

After pasteurization, the mix was aged by refrigerated storage at a temperature of 4° C. for 6 hours.

The aged mix was colored, flavored, acidified (e.g. adding citric acid solution), and then aerated in an Oakes Mixer at a temperature of 4° C. to an overrun of 100%.

The aerated mix was then pumped to a mold and then allowed to freeze to give the frozen molded bar. The freezing was allowed to take place quiescently at a temperature of −40° C. using cold brine. The frozen molded bar was demolded, and then packaged and stored at −30° C.

The frozen molded bar produced by the process of the present invention had the creamier and warm eating quality of an extruded product, a smooth, uniform, homogeneous texture and appearance, with air cells substantially none of which were visible to the naked eye. The molded aerated frozen bar had a quick melt with substantially no lingering of product in the mouth.

Example 3

An ice cream was prepared using the ingredients described in Table I using a conventional freezer as a whipper. The ice cream product had an overrun of 120%.

The draw temperature at the freezer outlet was constant at −6° C. After whipping the ice cream in a freezer, the product was placed into containers, conventionally hardened, and stored at −30° C.

TABLE I

| Ingredients | Percent Composition | |
|---|---|---|
| | Conventional | New |
| Fat | 10 | 10 |
| Non-fat milk solids | 7.5 | 7.5 |
| Whey solids | 2.5 | 2.5 |
| Sugar | 12.5 | 12.5 |
| Corn syrup solids, 36 DE | 4.5 | 4.5 |
| Guar | 0.15 | 0.15 |
| CMC | 0.05 | 0.05 |
| Carrageenan | 0.02 | 0.02 |
| Mono-diglycerides or monoglycerides | 0.30 | — |
| Propylene glycol monostearate | — | 0.3 |
| Sorbitan tristearate | — | 0.03 |
| Unsaturated monoglycerides | — | 0.05 |
| Water | 62.5 | 62.4 |
| Total solids | 37.5 | 37.6 |

To compare heat shock resistance, ice cream products made according to the present invention and using conventional methods were tested. Both types of ice cream products were treated to heat shock, as described above, or alternatively for 6 days at −8° C. Ice crystals, air bubble size and sensory attributes of the products were evaluated before and after the products were heat shock treated. Generally, the ice cream products using the present emulsifier system remained smoother and comparable to fresh standard products. (Table II and FIGS. 3 and 4). Additionally, the ice crystals and air bubble growth of the products according to the present invention were highly restricted during heat shock as compared to conventionally made ice cream products. (FIG. 5).

TABLE II

| Treatment | Method of Sample Preparation | |
|---|---|---|
| | Conventional | Present invention |
| Fresh/Not treated | 6.6 | 8.1 |
| Heat Shocked | 4.7 | 8.3 |

Measured by a trained sensory panel using a smoothness scale of 0 to 10. 0 being the least and 10 being the most smooth product.

What is claimed is:

1. A process for the production of aerated frozen products comprising the steps of preparing a mixture of ingredients suitable for preparing a frozen aerated product; adding an emulsifier mixture in a suitable amount to produce a mix; aerating the mix to obtain an aerated mix having an overrun of about 5% to about 250%; and freezing the aerated mix to form an aerated frozen product;
wherein the emulsifier mixture includes a blend of propylene glycol monostearate, sorbitan tristearate, and unsaturated monoglycerides so that the emulsifier mixture is capable of facilitating formation and stabilization of alpha fat crystals in an amount of about 0.1% to about 3% by weight of the mix; and
wherein the propylene glycol monostearate is present in an amount of about 0.1% to 1%, the sorbitan tristearate is present in an amount of about 0.01% to 0.2% and the unsaturated monoglycerides are present in an amount of about 0.01% to 0.2%, wherein each percent represents a weight percent based on the weight of the mix.

2. The process according to claim 1, which further comprises selecting the mix to be an ice cream mix, a water ice mix, a fruit juice mix, a frozen yogurt mix, a sherbet mix, ice milk mix, or a mixture thereof.

3. The process according to claim 1, wherein the mix of ingredients is prepared by combining the ingredients with shear mixing to disperse and solubilize them into a homogeneous mass, followed by homogenizing the mass and pasteurizing the homogenized mass.

4. The process according to claim 3, wherein the homogenizing step is conducted in a two stage homogenizer at a pressure of about 70 bar to about 250 bar in the first stage and of 0 bar to about 50 bar in the second stage.

5. The process according to claim 3, which further comprises aging the mix after pasteurization by storing the mix at a temperature of about 0° C. to about 6° C. for about 1 hour to about 24 hours.

6. The process according to claim 1, which further comprises coloring and flavoring the mix before aerating in a mixer at a temperature of about 0° C. to about 12° C. to obtain the desired overrun.

7. The process according to claim 1, wherein the aerated frozen product is water ice and the overrun is about 5% to about 100%.

8. The process according to claim 1, wherein the frozen aerated product is ice cream and the overrun is about 20% to about 250%.

9. The process according to claim 1, wherein the aerating step is conducted by allowing the mixture to pass through a conventional freezer with a draw temperature of about −4° C. to about −7° C.

10. The process according to claim 1, wherein the aerating step is a whipping step conducted by using a conventional mixer at a speed of about 10 L/h to about 1000 L/h.

11. The process according to claim 1, wherein the whipped mix is formed as individual serving portions, and those portions are provided with a coating or shell.

12. The process according to claim 11 which further comprises providing inclusions in the coating or shell.

13. The process according to claim 1, wherein the propylene glycol monostearate is present in an amount of about 0.2% to 0.5%, the sorbitan tristearate is present in an amount of about 0.02% to 0.05% and the unsaturated monoglycerides are present in an amount of about 0.02% to 0.1%, wherein each percent represents a weight percent based on the weight of the mix.

14. The process according to claim 1, wherein the propylene glycol monostearate is present in an amount of about 0.25% to 0.35%, the sorbitan tristearate is present in an amount of about 0.02% to 0.03% and the unsaturated monoglycerides are present in an amount of about 0.02% to 0.05%, wherein each percent represents a weight percent based on the weight of the mix.

15. The process according to claim 1 wherein the emulsifier mixture is capable of facilitating formation and stabilization of alpha fat crystals in an amount of about 0.1% to about 1% by weight of the mix.

16. The process according to claim 1 wherein the emulsifier mixture is capable of facilitating formation and stabilization of alpha fat crystals in an amount of about 0.02% to about 0.05% by weight of the mix.

17. The process according to claim 1 wherein the aerated mix is packaged into a container prior to forming the frozen product.

18. The process according to claim 1 wherein the aerated mix is frozen in a freezer and then extruded into bars or cones.

* * * * *